United States Patent Office 3,462,600
Patented Aug. 19, 1969

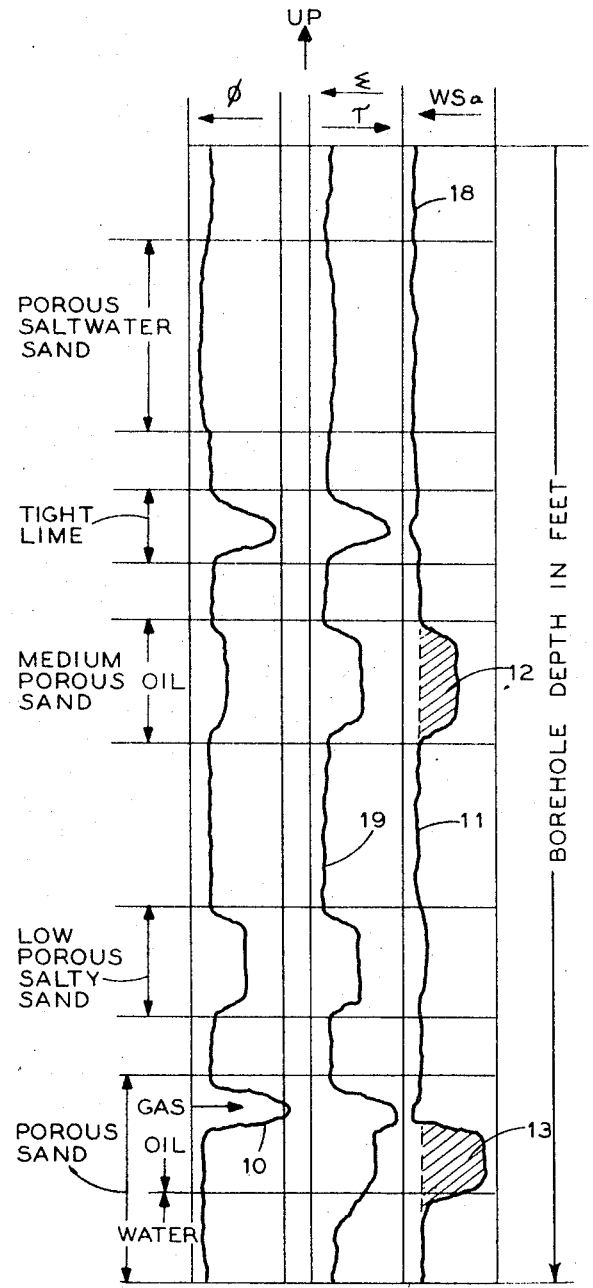

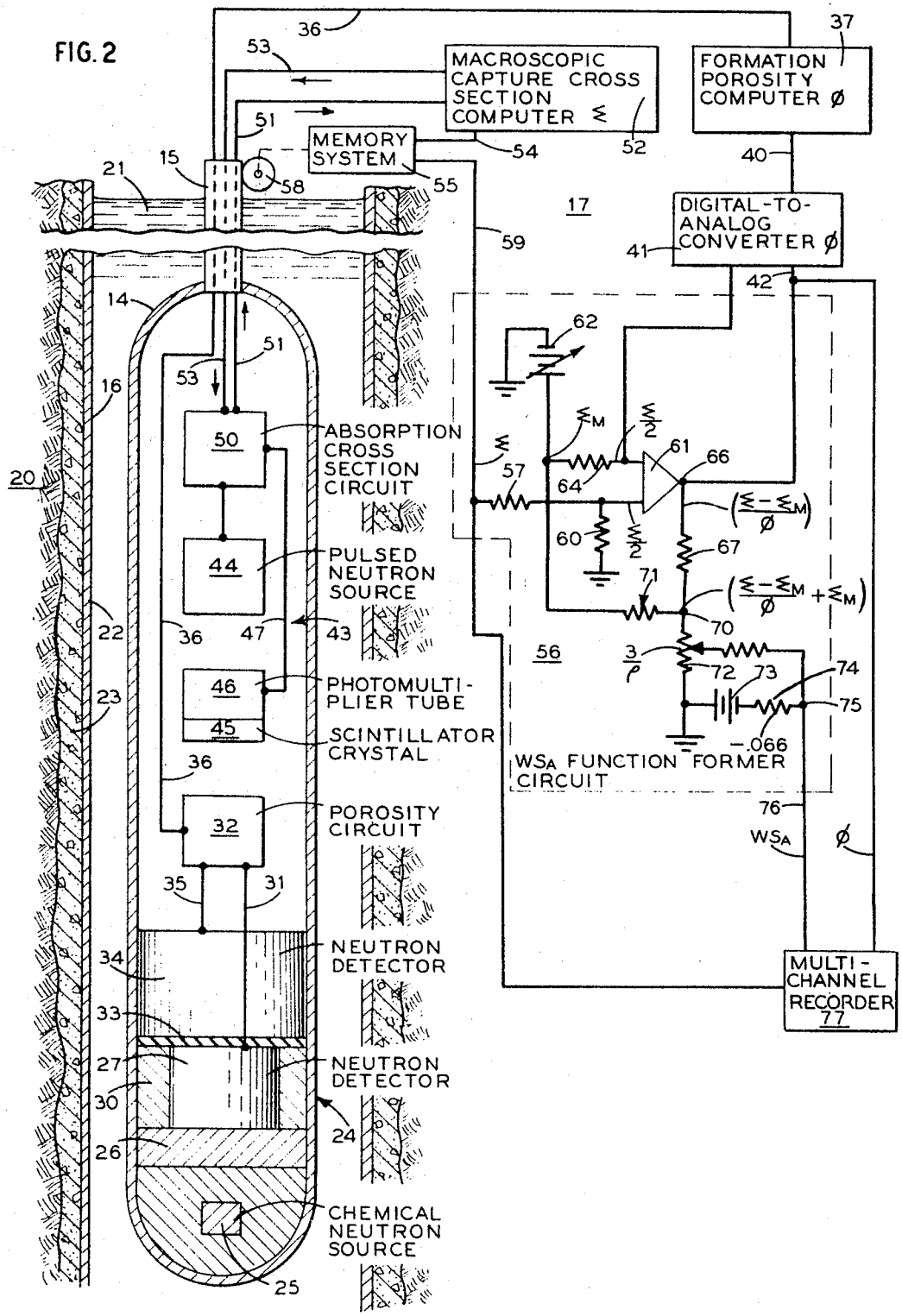

3,462,600
PULSED AND CONTINUOUS NEUTRON
WELL LOGGING TECHNIQUE
John T. Dewan, Houston, Tex., assignor to Schlumberger Technology Corporation, Houston, Tex., a corporation of Texas
Filed Jan. 31, 1967, Ser. No. 613,024
Int. Cl. G01t 3/00, 1/18
U.S. Cl. 250—83.1        3 Claims

ABSTRACT OF THE DISCLOSURE

The invention measures the porosity of an earth formation and the chlorine concentration of the water within the formation to identify oil producing horizons that are concealed by borehole casing. Porosity is measured through two axially spaced neutron detector tubes that observe neutron diffusion within the formation. Chlorine concentration is measured through another detector that observes the decay time of the thermal neutron population within the formation.

Cross-references to related applications

U.S. patent application Ser. No. 570,068, filed on Aug. 3, 1966, for "Measuring Apparatus and Method," by Stanley Locke, Harold Sherman and John S. Wahl; and U.S. patent application Ser. No. 592,795, filed on Nov. 8, 1966, for "Method and Apparatus for Measuring Neutron Characteristics of a Material," by William B. Nelligan, both assigned to the same assignee as the invention described herein.

BACKGROUND OF THE INVENTION

Field of the invention

This invention relates to well logging methods and apparatus, and more particularly, to radiation techniques for identifying oil in the earth formations that surround a borehole, and the like.

Description of the prior art

Accurate identification of potential oil-producing horizons in the earth formations surrounding a borehole is a major goal of the well logging industry. An especially valuable technique would enable geologists and petroleum engineers to locate these possible oil-producing zones from boreholes that have been "cased" with one or more strings of steel pipe and cement annuli.

When the oil is depleted in the production zone tapped by one of these cased wells, possibility still exists that there may be other production zones concealed from observation by the casing material. Consequently, in these circumstances there is a need for a reliable technique that can identify oil-bearing formations. This need is particularly apparent in connection with older cased wells. Usually, these older wells never were logged, or were logged only through a limited range of borehole depth. Accordingly, as the major oil reservoirs tapped by these wells are exhausted, a thorough search for further production zones which were overlooked during drilling is clearly desirable.

The steel pipe and the irregular annuli of cement present formidable barriers to the examination of the earth formations beyond the casing. The steel renders electrical well logging techniques useless, and the combined steel and concrete can produce misleading nuclear logs if proper techniques are not used.

In spite of these difficulties, some suggestions for taking formation measurements through borehole casing materials have been advanced. For example, one is to irradiate the formation and casing with neutrons and measure the resulting gamma rays. The gamma rays emitted from the formation as a result of capture of the irradiating neutrons by the nuclei that comprise the formation ought to provide some indication of the formation porosity, and hence, the oil-bearing potential of the zone under study. Measuring formation porosity in this manner, however, introduces a source of error because the steel pipe depresses the magnitude of the neutron population and thereby degrades the quality of the formation porosity data.

Other proposals have been directed to techniques for measuring fluid salinity within the formation pores. One suggested technique would irradiate the casing and the adjacent formation with bursts of fast neutrons. As the neutrons in each burst diffuse through the formation, they lose their kinetic energy through collisions with the formation nuclei. Ultimately these neutrons would be slowed down until their average kinetic energy is equal to the average kinetic energy of the formation molecules. When this condition occurs, these neutrons are considered thermal neutrons. Thermal neutrons are readily absorbed by chlorine in the saline water. Therefore, measuring the decline in the magnitude of the thermal neutron population provides an indication of formation water salinity.

Neither of these proposed techniques directly identify potential oil-producing zones through casing materials. Porosity and fluid salinity are useful indications, but each alone fails to locate precisely the most likely production horizons.

Accordingly, it is an object of the invention to identify oil-producing formations with greater precision.

It is another object of the invention to identify oil-producing formations in spite of the presence of casing materials in the borehole.

It is a further object of the invention to combine measurements of the neutron slowing down characteristics of a formation with thermal neutron absorption characteristics to indicate the apparent formation water salinity.

Summary of the invention

In accordance with the invention, a measurement is made of the apparent concentration of salt water in a formation. The porosity of the same formation also is measured. If the formation under study is porous and the salt concentration is unusually low, the presence of some nonsaline liquid, such as oil or fresh water, is indicated.

The apparent fluid salinity, moreover, may be measured through a novel combination of the porosity and the property characterizing absorption of thermal neutrons within the formation. This latter property is called the thermal neutron macroscopic capture cross section of the formation.

More particularly, in one embodiment of the invention, a well logging tool or sonde measures porosity through the spatial distribution of the neutrons radiating from the tool. The tool also measures the macroscopic capture cross section of the formation by first irradiating the formation with bursts of neutrons and then measuring the decay of the thermal neutron population following each burst.

A circuit combines the porosity and cross section measurements according to a specific relationship to produce a signal that corresponds to the apparent salt concentration in the formation liquid.

Porosity is determined accurately through casing materials, in the exemplary embodiment of the invention, by continuously irradiating the casing and the formation with neutrons. Two neutron detectors spaced at different distances from the neutron source measure the diffusion of the neutrons through the formation. By properly choosing the detector sensitivities and positions relative to the neutron source, the adverse effects of the steel pipe and concrete are overcome and the measured spatial distribution of the neutrons indicates the formation porosity in the manner described more completely, for example, in the aforementioned Locke et al. patent application for a "Measuring Apparatus and Method."

The macroscopic absorption cross section of the formation is measured through the borehole casing with a source that emits neutrons in precisely timed bursts. A detector associated with this latter source is interrogated during two intervals between each burst to measure the time-dependent decline in the thermal neutron population. These thermal neutron measurements can be evaluated, for example, in terms of the macroscopic capture cross section of the formation or, if preferable, the formation thermal neutron decay time, as described more fully, for example, in the aforementioned Nelligan patent application for a "Method and Apparatus for Measuring Neutron Characteristics of a Material."

One aspect of the invention combines the porosity and cross section data in a computer according to a novel relation that expresses apparent water salinity as a function of porosity and the macroscopic cross section of the formation under study.

For a better understanding of the present invention, together with other and further objects thereof, reference is had to the following description taken in connection with the accompanying drawings, the scope of the invention being pointed out in the appended claims.

Brief description of the drawing

FIG. 1 is a representative graph illustrating features of the invention; and

FIG. 2 is a schematic diagram of a tool embodying the principles of the invention, showing the electrical circuits in block diagram form.

Description of the preferred embodiments

In order to more fully appreciate the principles and advantages of the present invention, in FIG. 1 an exemplary graph of formation porosity 10, referred to by the Greek letter $\phi$, as a function of borehole depth. Also shown is a graph of apparent fluid salinity 11, referred to by the symbol $WS_a$. In accordance with one aspect of the invention, oil-bearing horizons are indicated in the formations at the borehole depths 12 and 13 which are identified by shading. In the shaded areas 12 and 13 the salt concentration in the fluid is reduced from an average formation value characterized by the reference or base line 18, to abnormally low fluid salinity values. The low salinity of the fluid in zones 12 and 13 clearly indicates some non-salt bearing liquid within the formation. In these circumstances the presence of oil at the depths indicated by the shaded areas 12 and 13 is very likely. Fresh water also is a possibility. Fresh water, however, usually is found close to the earth's surface. Consequently, in the absence of some unique earth formation characteristics and at appreciable borehole depths, the shaded portions 12 and 13 almost certainly indicate oil production zones.

The apparent water salinity graph 11 is determined in accordance with a further aspect of the invention which enables the apparent salt concentration, $WS_a$, in the formation fluid to be calculated accurately in spite of the aforementioned borehole casing materials. This novel relation combines the formation porosity $\phi$ and the macroscopic thermal neutron capture cross section of the formation $\Sigma$, as shown by the representative curve 19 in FIG. 1, in accordance with an equation that is developed through the following derivation.

$$\Sigma = \phi \Sigma_f + (1-\phi)\Sigma_m \qquad (1)$$

where $\Sigma_f$ is the macroscopic thermal neutron capture cross section of the formation fluids and $\Sigma_m$ is the macroscopic thermal neutron capture cross section of the materials that comprise the formation matrix. Because $$\Sigma = \frac{1}{v\tau} \qquad (2)$$

$$v \alpha \sqrt{T} \qquad (3)$$

$$\Sigma \alpha \frac{1}{\sqrt{T}} \qquad (4)$$

where $v$ is the thermal neutron velocity, $\tau$ is the thermal neutron lifetime, and $T$ is the absolute temperature of the formation, then $$\Sigma_f = \frac{1}{\phi}\left[\frac{1}{v_0\tau} - (1-\phi)\Sigma_m^0\right]\sqrt{\frac{273}{T}} \qquad (5)$$

in which $v_0$ is a constant that is equal to average speed of neutrons in thermal equilibrium at 273° absolute (K), and $\Sigma_m^0$ is the macroscopic neutron capture cross section of the formation matrix materials at 273° K.

$\Sigma_f$ also can be expressed in terms of water salinity $WS_a$, $$\Sigma_f = \left[\rho(1-WS_a)\Sigma_{H_2O}^0 + \rho WS_a\left(\frac{\Sigma_{NaCl}^0}{\rho_{NaCl}}\right)\right]\sqrt{\frac{273}{T}} \qquad (6)$$

where $\rho$ is the fluid density; $\Sigma_{H_2O}^0$ is the macroscopic capture cross section of water at standard temperature and pressure (STP) which is a constant value of .022 cm.$^{-1}$; $\Sigma_{NaCl}^0$ is the macroscopic neutron capture cross section for salt at STP, which has a constant value of .355 cm.$^{-1}$; and $\rho_{NaCl}$ is the density of the salt.

Combining Equations 5 and 6, $$\rho\Sigma_{H_2O}^0 + \rho WS_a\left[\left(\frac{\Sigma_{NaCl}^0}{\rho_{NaCl}}\right) - \Sigma_{H_2O}^0\right] = \frac{1}{\phi}\left[\frac{1}{v_0\tau} - (1-\phi)\Sigma_m^0\right] \qquad (7)$$

Solving for $WS_a$, $$WS_a = \frac{1}{\rho\phi}\left[\frac{1}{v_0\tau} - (1-\phi)\Sigma_m^0\right] - \Sigma_{H_2O}^0 \qquad (8)$$

Substituting values for the constants $v_0$, $\Sigma_{H_2O}^0$, $\Sigma_{NaCl}^0$ and $\rho_{NaCl}$, $$WS_a = \frac{1}{.333\rho\phi}\left[\frac{4.55}{\tau} - \Sigma_m^0\right] + \left[\frac{\Sigma_m^0}{.333\rho}\right] - .066 \qquad (9)$$

where $$\Sigma = \frac{4.55}{\tau} \qquad (10)$$

Substituting $\Sigma$ and collecting values, $$WS_a = \frac{3}{\rho}\left(\frac{\Sigma - \Sigma_m^0}{\phi} + \Sigma_m^0\right) - .066 \qquad (11)$$

Accordingly, the water salinity $WS_a$ can be computed in terms of the formation porosity $\phi$ and the formation macroscopic capture cross section for thermal neutrons, $\Sigma$. The constant $\Sigma_m^0$ is a characteristic of the chemical composition of the specific formation under study. $\Sigma_m^0$ can be determined through a visual examination of drill cuttings or the like, and subsequently referring to a table $\Sigma_m^0$ values for different chemical compounds as for example:

Formation:      $\Sigma_m^0$(cm.$^{-1}$)
$CaCO_3$ ---------------------------------- .00724
$SiO_2$ ---------------------------------- .00424
$CaMg(CO_3)_2$ ---------------------------------- .00476
$CaSO_4$ ---------------------------------- .0126

Thus, the apparent water salinity $WS_a$ can be determined through a combination of two formation parameters, $\Sigma$ and $\phi$, which can be measured through borehole casing materials.

An illustrative embodiment of a practical apparatus for identifying formation porosity and fluid salinity in accordance with these principles is shown in FIG. 2 of the drawing.

A fluid-tight pressure resistant housing 14 is suspended by an armored cable 15 in a borehole 16. As will be described later in detail, cable 15 may comprise a group of insulated conductors that electrically connect the equipment within the housing 14 with a computer 17 at the earth's surface. A winch (not shown) located at the surface of the earth is utilized to lower and raise the apparatus in the borehole 16 in the customary manner to traverse earth formations 20. The borehole 16 may be dry, or may be filled with a water-base or oil-base drilling mud 21 as shown. Borehole 16 may be uncased or it may be lined with one or more strings of steel casing 22 surrounded by annuli of concrete 23, also as shown.

Supported in the lowermost end of the housing 14 is a neutron radiation device 24 which measures the spatial distribution of a continuous flux of neutrons through the formation 20. This measurement may be expressed in terms of formation porosity in the manner described in more complete detail in the aforementioned Locke et al. patent application. More specifically, the neutron radiation device 24 has a chemical neutron source 25 that irradiates earth formation 20 with a continuous stream or flux of neutrons. These irradiating neutrons penetrate the steel casing 22 and the concrete 23 to diffuse through the formation 20. The porosity of the specific formation being irradiated largely determines the ultimate spatial distribution of the neutrons within the formation. Thus, by measuring the relative neutron concentrations at two points axially spaced at different distances from the source, the formation porosity can be determined. This determination, moreover, is independent of borehole effects if the distances between the source and the neutron detection points are sufficiently great to enable most of the neutrons diffusing through the casing and mud to be absorbed before reaching the places where the measurements are to be made.

Spaced from the chemical neutron source 25 by a disc of neutron absorbing material 26, such as boron carbide or the like, is a neutron detector tube 27 which may be a gas-filled tube having a central anode wire and a cylindrical cathode concentric therewith (not shown). The annular volume defined by the anode and the cathode may be filled with $He^3$ at a pressure of four atmospheres. The tube 27 detects neutrons radiated from the chemical source 25 which are scattered back from the earth formation 20. After passing through the housing 14, these back-scattered neutrons also pass through an annular spacer 30 interposed between the cathode of the neutron detector 27 and the inner surface of the housing 14. The spacer 30 preferably is made of some material, such as aluminum, that is substantially transparent to the transmission of neutrons. Neutrons on entering the active volume of the detector 27 collide with the $He^3$ atoms in the filling gas to produce $He^3(n,p)H^3$ reactions which ionize the gas between the anode and cathode and produce a charge pulse in the electrodes of the neutron detector 27. This pulse, or "count," is transmitted through conductor 31 to porosity circuit 32 in the housing 14.

A similar neutron detector tube 34 is spaced from the detector 27 in an axial direction by a thin gasket 33. The detector 34 is more sensitive to neutrons than the detector 27, because the transverse dimensions of the tube 34 are much greater than tube 27, being substantially coextensive with the cross section of the housing 14. The detector 34 is as neutron-sensitive as the dimensional limitations of a housing of reasonable size will permit in order to produce a statistically valid accumulation of counts needed for a formation porosity computation.

It has been found, as described in more complete detail in the aforementioned Locke et al. patent application, that appropriately spacing the neutron detectors 27 and 34 from the chemical neutron source 25 substantially eliminates the effect of the steel 22, cement 23, and the drilling mud 21 on the measurement of the neutron diffusion characteristics of the formation 20.

Counts characterizing neutron reactions within the active volume of the neutron detector 34 are transmitted through conductor 35 to the porosity circuit 32. The digital signals corresponding to the counts registered in the porosity circuit 32 from both of the detectors 27 and 34 are transmitted to the earth's surface through conductor 36 in the cable 15.

These signals in the conductor 36 are applied to a porosity computer 37 that converts the digital pulses into another signal that corresponds to the ratio of the counts registered in the neutron detector 27 to the counts registered in the neutron detector 34. This ratio of counts is unique to a specific formation porosity.

Inasmuch as the ratio expressing the porosity $\phi$ is in digital form, a multiconductor cable 40 transfers the digital porosity signals from the computer 37 to a digital to analog converter 41.

Typically, a converter of this sort may comprise an array of electromagnetic relays, each of which is energized by a digital signal in a respective conductor in the cable 40. As each magnet is operated in response to a signal, relay contacts are closed to connect an associated resistance in series with other similarly connected resistances. Thus, for each digital porosity signal a resistance network is established that is related to the formation porosity. This resistance network is connected in series with a conductor 42 in a feedback circuit for calculating apparent water salinity, $WS_a$, that will be described subsequently.

The macroscopic thermal neutron capture cross section $\Sigma$ for the formation 20 also is needed to compute the water salinity, $WS_a$, in accordance with Equation 11. To produce a signal that corresponds to $\Sigma$ for the formation 20, a pulsed neutron radiation device 43 may be placed within the housing 14. The pulsed device 43 is positioned axially above the neutron radiation device 24. The pulsed neutron radiation device 43 in the exemplary embodiment shown may comprise a pulsed neutron source 44 of the type described in U.S. Patent No. 2,914,677 granted to Wayne R. Arnold on Nov. 24, 1959 for "Well Logging Apparatus."

The neutron source 44 radiates bursts of neutrons into the formation 20. The rate at which the neutrons that have been degraded in energy to thermal equilibrium with the formation molecules are absorbed by the formation 20 is a function, to a large extent, of the thermal neutron formation macroscopic capture cross section $\Sigma$.

Consequently, $\Sigma$ can be determined by measuring the rate at which the thermal neutrons are absorbed within the formation 20. Alternatively, the thermal decay time $\tau$ can be computed because $\Sigma$ is related to $\tau$ in accordance with Equation 2.

To detect these pulsed thermal neutrons, a scintillator crystal 45 in the housing 14 produces flashes of light in response to the absorption of thermal neutrons in a coating of a suitable boron composition on the crystal surface (not shown). A photomultiplier tube 46 is optically coupled to the crystal 45 and converts each flash of light into an amplified electrical charge pulse. Each pulse from the photomultiplier tube 46 is transmitted through conductor 47 to an absorption cross section circuit 50 in the housing 14.

Signals from the absorption cross section circuit 50 are transmitted to the earth's surface through conductor 51 in the armored cable 15. These signals are received in macroscopic capture cross section computer 52.

As described in more complete detail in the aforementioned Nelligan patent application, the computer 52 registers pulses from the photomultiplier tube 46 during a first time period that is roughly equal to the time required for the thermal neutron population to decay by a factor of $1/e$, where $e$ is the natural logarithm base. This interval is defined as the decay time of the formation 20. The decay time is determined more precisely, however, by measuring the neutron population during a second interval of time that is twice as long as the first. The counting rates in each of these intervals are compared automatically. The detector time periods, or interrogation intervals, are changed by the computer 52 through a signal fed back to the cross section circuit 50 through conductor 53 until the ratio of the counting rates during the first interval to the second interval is 1.99. When this ratio is struck, the first interrogation interval is equal to the decay time $\tau$.

Usually, the first sampling interval commences about two decay times after the termination of the preceding neutron burst. This delay enables the more rapidly decaying thermal neutron population characterizing the borehole to dissipate before a measurement is made. The counting rates measured after this initial decay are more directly related to the formation 20 and are not degraded by the influence of the mud 21, steel casing 22 and concrete 23.

The thermal decay time $\tau$ is converted in the computer 52 into an analog signal that is proportional to the macroscopic capture cross section $\Sigma$ in accordance with the equation $$\Sigma = \frac{4.55}{\tau} \qquad (12)$$

Of course, the neutron device 24 and the pulsed neutron device 43 should be axially separated by a sufficient distance such that the neutrons radiating from respective sources 25 and 44 do not interfere with the detectors associated with the other devices. The strengths of the sources and the magnitudes of the neutron capture cross sections in the borehole and surrounding formation, however, are such that both of these neutron devices 24 and 43 can be accommodated in one housing of reasonable size.

Because the scintillator crystal 45 in the illustrative embodiment is separated from the neutron detectors 27 and 34, the neutron device 24 and the pulsed device 43 necessarily are not measuring the same portion of the earth formation 20 at the same time. Thus, without an appropriate compensation, the curves of salinity and porosity shown in FIG. 1 cannot be superimposed directly.

This discrepancy is overcome, when recording data as the housing 14 is drawn upwardly through the borehole 16, by providing a memory system 55 in the output conductor 54 of the capture cross section computer 52. The memory system 55 stores the cross section signal for the time required to move the neutron detectors 27 and 34 up the borehole 16 a distance equal to their separation from the scintillator crystal 45.

The memory system 55 is paced by the schematic measuring wheel and linkage 58 associated with the armored cable 15 to adjust the signal in the memory system 55 to match changes in the upward movement of the housing 14 through the borehole 16. In this manner the macroscopic capture cross section signal and the formation porosity signal correspond to the same position in the borehole 16.

The macrascopic capture cross section signal $\Sigma$ in the memory system 55 is applied through conductor 59 to an apperent water salinity function former circuit 56. The signal $\Sigma$ is converted by resistances 57 and 60 to a value equal to $\Sigma/2$. The $\Sigma/2$ signal then is coupled to the input of amplifier 61. The macroscopic thermal neutron capture cross section of the matrix $\Sigma_m$, which is a constant value for each formation material, is provided by connecting a source of selectively variable potential 62 to the input of the amplifier 61 through a resistance 64. In this connection, it may be convenient to provide a matrix selection switch (not shown) which adjusts the voltage source 62 to a specific value for each formation matrix encountered within the borehole 16. Thus, during a logging run, as the housing 14 enters a different formation the switch can be manipulated to apply the potential that corresponds to the correct value of $\Sigma_m$ to the input of the amplifier 61.

Because the salinity, $WS_a$, is inversely proportional to the porosity $\phi$, as demonstrated in Equation 11, the formation porosity is introduced to the function former circuit 56 through a constant resistance "T" pad in the feedback loop 42, of which the digital-to-analog converter 41 is a part.

Typically, a "T" pad of this character is an array of three variable resistances. One resistance in the array is grounded at one terminal and changes in value according to the formation porosity, $\phi$, as hereinbefore mentioned in connection with the operation of the converter 41. The other two resistances in the array are connected to the undergrounded terminal and to the input and output terminals of the amplifier 61, respectively. The values of these latter two resistances change in accordance with the value of the grounded resistance in order to keep the equivalent resistance of the entire "T" pad array at a constant value as measured in the feedback loop from the junction with the input to amplifier 61.

The signal thus produced at the output junction 66 of the amplifier 61 is proportional to the expression $$\left(\frac{\Sigma - \Sigma_m}{\phi}\right) \qquad (13)$$

This signal is sent from the amplifier output through a resistance 67 to a junction 70 where it is combined with another signal that corresponds to $\Sigma_m$. This latter signal is obtained from a resistance 71 that is connected to the variable potential source 62. The combined voltages at the junction 70 are an analog of the expression $$\left(\frac{\Sigma - \Sigma_m}{\phi} + \Sigma_m\right) \qquad (14)$$

Inasmuch as the fluid density $\rho$ varies slightly as a function of salinity, temperature and pressure, the density is applied to the salinity circuit 56 through a potentiometer 72. Thus the voltage at the junction 70 is coupled to the potentiometer 72, the resistance of which is adjusted to be approximately inversely proportional to the fluid density as determined through prior experience with similar formations. In this manner, the signal at the tap of the potentiometer 72 corresponds to the expression $$\frac{3}{\rho}\left(\frac{\Sigma - \Sigma_m}{\phi} + \Sigma_m\right) \qquad (15)$$

Battery 73 and resistor 74 are connected to the output of the potentiometer 72 at junction 75. The voltage applied to the junction 75 by the resistor 74 corresponds to the negative quantity $-.066$ in the equation 11. Accordingly, the voltage at the junction 75 is proportional to the apparent water salinity $WS_a$, because $$WS_a = \frac{3}{\rho}\left(\frac{\Sigma - \Sigma_m}{\phi} + \Sigma_m\right) - .066 \qquad (16)$$

Thus, a signal that is proportional to the apparent salinity of the water in the formation 20 is applied by the function former circuit 56 to an output lead 76. A conventional multichannel recorder 77 may be connected to the leads 76 and 42 which bear the analog signals that corespond to $WS_a$ and $\phi$ respectively. Conductor 59 also can be connected to the recorder 77 to provide a trace of $\Sigma$ as a function of borehole depth. Thus, the recorder 77 may produce a graph of apparent salinity, macroscopic capture cross section and formation porosity as a function of borehole depth as shown in FIG. 1.

As shown in FIG. 2, the housing 14 travels freely through the borehole 16. It may be advisable, however, in some situations, such as in boreholes which are not cased, to bias the housing, or a portion thereof, eccentrically within the borehole. This forced eccentricity will urge the housing into engagement with one side of the borehole wall and produce more accurate data in these circumstances.

While particular embodiments of the present invention have been shown and described, it is apparent that changes and modifications may be made without departing from this invention in its broader aspects. And, therefore, the aim in the appended claims is to cover all such changes and modifications as fall within the true spirit and scope of this invention.

What is claimed is:

1. Equipment for identifying potential oil-bearing horizons in an earth formation matrix containing saline fluid and traversed by a borehole comprising a housing, a source within said housing for continuously irradiating the earth formation with neutrons, a gas-filled neutron detector within said housing spaced from said continuous neutron source, another gas-filled neutron detector substantially abutting said other gas-filled neutron detector and having transverse dimensions generally coextensive with said housing, circuit means responsive to both of said gas-filled neutron detectors for producing a signal that corresponds to the porosity of the earth formation, $\phi$, a pulsed neutron source in said housing for irradiating the earth formation with successive pulses of neutrons, a scintillation detector within said housing responsive to radiation in the earth formation characterizing said neutron pulses, further circuit means associated with said scintillation detector for producing for signal that corresponds to the macroscopic neutron absorptive cross section of the formation, $\Sigma$, and for selectively activating said scintillation detector in timed relationship with said absorption cross section, a source for providing a signal that corresponds to the macroscopic capture cross section of the earth formation matrix, $\Sigma_m$, a difference circuit for establishing a signal that is related to the difference between $\Sigma$ and $\Sigma_m$, and a summation circuit for producing a signal that corresponds to the quotient of $\phi$ and the difference between $\Sigma$ and $\Sigma_m$.

2. Equipment for identifying potential oil-bearing horizons according to claim 1 wherein said gas-filled neutron detectors comprise $He^3$ filling gas.

3. A circuit for producing a signal that corresponds to the salinity of earth formation water comprising circuit means for producing a signal that corresponds to the porosity $\phi$ of an earth formation, a further circuit for generating a signal that is related to the macroscopic neutron capture cross section $\Sigma$ of the earth formation, another circuit for producing a signal that corresponds to the macroscopic capture cross section of the earth formation matrix $\Sigma_m$, a difference circuit for establishing a signal that is related to the difference between $\Sigma$ and $\Sigma_m$, and a summation circuit for producing a signal proportional to the salinity of the earth formation water that corresponds to the quotient of said $\phi$ signal and said $\Sigma$ and $\Sigma_m$ difference signal.

References Cited

UNITED STATES PATENTS

| 2,776,378 | 1/1957 | Youmans. |
| 2,971,094 | 2/1961 | Tittle | 250—83.1 |
| 2,991,364 | 7/1961 | Goodman. |

OTHER REFERENCES

Youmans et al.: Neutron Lifetime, A New Nuclear Log, published by Lane-Wells, Oct. 9, 1963, pages 3–13.

RALPH G. NILSON, Primary Examiner

MORTON J. FROME, Assistant Examiner

U.S. Cl X.R.

250—83.6